UNITED STATES PATENT OFFICE.

WILHELM BAUER, OF VOHWINKEL, AND ALFRED HERRE AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

1,005,140. Specification of Letters Patent. Patented Oct. 10, 1911.

No Drawing. Application filed July 21, 1910. Serial No. 573,048.

*To all whom it may concern:*

Be it known that we, WILHELM BAUER, residing at Vohwinkel, and ALFRED HERRE and RUDOLF MAYER, residing at Elberfeld, Germany, citizens of the German Empire, have invented new and useful Improvements in Vat Dye, of which the following is a specification.

Our invention relates to the manufacture and production of new and valuable vat dyestuffs. They are obtained by condensing beta-naphthisatin derivatives in which the oxygen of the alpha-keto group is replaced by easily movable or replaceable substituents, e. g. halogen, sulfur, the amino group, the alkoxy group with a para-substituted 1-naphthol, especially 4-ethoxy-1-naphthol, 4-bromo-1-naphthol, 4-chloro-1-naphthol.

The new dyes which probably contain in their molecule the group:

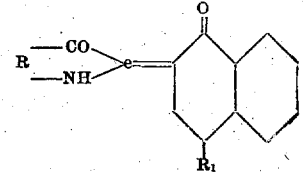

R meaning the naphthalin nucleus of the meta-naphthisatin, $R_1$ a substituting group, are in a dry state dark crystalline powders with a metallic luster which are soluble in hot nitrobenzene generally with a blue coloration, and which yield with hydrosulfite and caustic soda lye generally yellow vats dyeing cotton after exposure to air gray to black shades remarkable for their fastness to chlorin.

In order to illustrate the new process more fully we can proceed as follows, the parts being by weight:—197 parts of beta-naphthisatin are converted into the alpha-chlorid by heating them with 220 parts of $PCl_5$ and 3500 parts of dry chlorobenzene. The mixture thus obtained is then added to a solution, which is well stirred, of 250 parts of 4-bromo-1-naphthol in 1500 parts of dry chlorobenzene; stirring is continued for 12 hours. The dye is filtered off and washed with benzene and ether and can be further purified by a recrystallization from nitrobenzene. It is a dark crystalline powder with a metallic luster having probably the formula:

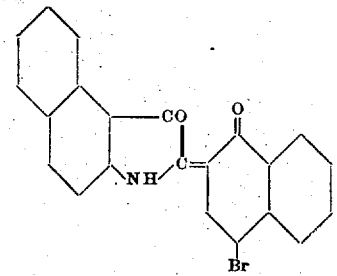

soluble in concentrated sulfuric acid with a dark blue color, in hot nitrobenzene with a greenish-blue color. It forms a yellow vat with hydrosulfite and caustic alkali, from which cotton is dyed after exposure to air in fast gray to black shades. Its formation takes probably place according to the following formulæ:

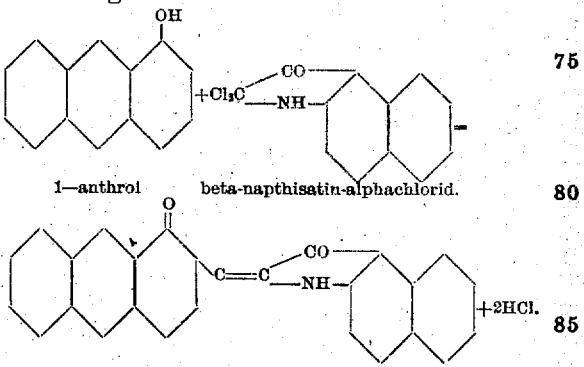

We claim:—

1. The herein described new dyestuffs which probably contain in their molecule the group:

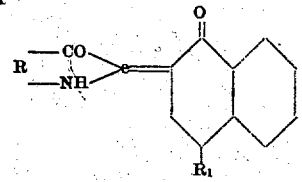

R meaning the naphthalin nucleus of the beta-naphthisatin, $R_1$ a substituting group, which dyestuffs are in a dry state dark crystalline powders with a metallic luster which are soluble in hot nitrobenzene generally with a blue coloration, and which yield with hydrosulfite and caustic soda lye vats dyeing cotton after exposure to air from gray to black shades remarkable for their fastness to chlorin, substantially as described.

2. The herein described new dyestuff having probably the formula:

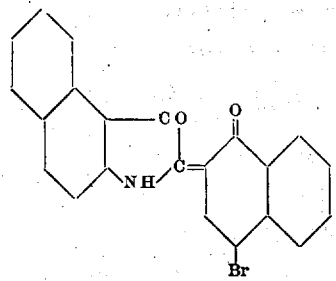

which dyestuff is in a dry state a dark crystalline powder with a metallic luster, soluble in concentrated sulfuric acid with a dark blue color, and which yields with hydrosulfite and caustic soda lye a yellow vat from which cotton is dyed a gray to black remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
CHAS. J. WRIGHT,
WALTER VONNEGUT.

---

It is hereby certified that in Letters Patent No. 1,005,140, granted October 10, 1911, upon the application of Wilhelm Bauer, of Vohwinkel, and Alfred Herre and Rudolf Mayer, of Elberfeld, Germany, for an improvement in "Vat Dyes," an error appears in the printed specification requiring correction as follows: Page 1, line 70, beginning with the word "Its" strike out all matter to and including line 86; and that the said Letters Patent should be read with this correction therein that the same may conform to the record of the case in the Patent Office.

Signed and sealed this 30th day of January, A. D., 1912.

[SEAL.]

C. C. BILLINGS,
*Acting Commissioner of Patents.* cotton after exposure to air from gray to black shades remarkable for their fastness to chlorin, substantially as described.

2. The herein described new dyestuff having probably the formula:

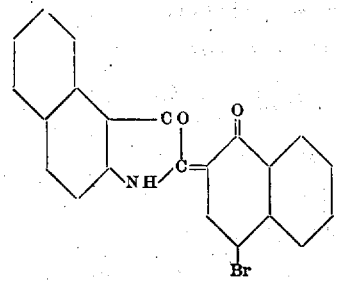

which dyestuff is in a dry state a dark crystalline powder with a metallic luster, soluble in concentrated sulfuric acid with a dark blue color, and which yields with hydrosulfite and caustic soda lye a yellow vat from which cotton is dyed a gray to black remarkable for its fastness to chlorin, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
CHAS. J. WRIGHT,
WALTER VONNEGUT.

---

It is hereby certified that in Letters Patent No. 1,005,140, granted October 10, 1911, upon the application of Wilhelm Bauer, of Vohwinkel, and Alfred Herre and Rudolf Mayer, of Elberfeld, Germany, for an improvement in "Vat Dyes," an error appears in the printed specification requiring correction as follows: Page 1, line 70, beginning with the word "Its" strike out all matter to and including line 86; and that the said Letters Patent should be read with this correction therein that the same may conform to the record of the case in the Patent Office.

Signed and sealed this 30th day of January, A. D., 1912.

[SEAL.]

C. C. BILLINGS,
*Acting Commissioner of Patents.*

It is hereby certified that in Letters Patent No. 1,005,140, granted October 10, 1911, upon the application of Wilhelm Bauer, of Vohwinkel, and Alfred Herre and Rudolf Mayer, of Elberfeld, Germany, for an improvement in "Vat Dyes," an error appears in the printed specification requiring correction as follows: Page 1, line 70, beginning with the word "Its" strike out all matter to and including line 86; and that the said Letters Patent should be read with this correction therein that the same may conform to the record of the case in the Patent Office.

Signed and sealed this 30th day of January, A. D., 1912.

[SEAL.]

C. C. BILLINGS,
*Acting Commissioner of Patents.*